(12) United States Patent
Ngai et al.

(10) Patent No.: US 7,774,312 B2
(45) Date of Patent: Aug. 10, 2010

(54) SELF-MANAGING PERFORMANCE STATISTICS REPOSITORY FOR DATABASES

(75) Inventors: Gary Ngai, Saratoga, CA (US); Michael Feng, San Mateo, CA (US); Alex Tsukerman, Foster City, CA (US); Benoit Dageville, Foster City, CA (US); Mark Ramacher, San Carlos, CA (US); Karl Dias, Foster City, CA (US); Graham S. Wood, El Granada, CA (US); Leng Leng Tan, Sunnyvale, CA (US); Richard Sarwal, Portola Valley, CA (US); Sushil Kumar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 568 days.

(21) Appl. No.: 10/934,771

(22) Filed: Sep. 3, 2004

(65) Prior Publication Data

US 2005/0086263 A1      Apr. 21, 2005

Related U.S. Application Data

(60) Provisional application No. 60/500,869, filed on Sep. 4, 2003.

(51) Int. Cl.
    *G06F 17/30* (2006.01)
(52) U.S. Cl. .................. 707/637; 707/649; 707/688
(58) Field of Classification Search .............. 707/1, 707/2, 6, 7, 8
    See application file for complete search history.

(56) References Cited

U.S. PATENT DOCUMENTS 6,035,306 A * 3/2000 Lowenthal et al. .......... 707/200
6,804,627 B1 * 10/2004 Marokhovsky et al. ...... 702/182
6,816,905 B1 * 11/2004 Sheets et al. ................ 709/226
7,035,881 B2 * 4/2006 Tummala et al. ................ 1/1
7,526,409 B2 * 4/2009 Ramacher et al. .......... 702/182
2002/0087587 A1 * 7/2002 Vos et al. .................... 707/203
2002/0091708 A1 * 7/2002 Vos et al. .................. 707/104.1

OTHER PUBLICATIONS

Chaudhuri, Surajit, "Self-Managing DBMS Technology at Microsoft," Microsoft Research, Sep. 1, 2004, pp. 1-35.*
Doppelhammer, et al "Database Performance in the Real World—TPC-D and SAP R/3," ACM, 1997, pp. 123-134.*
Hagmann, et al., "Performance Analysis of Several Back-End Database Architecture," ACM, 1986, vol. 11, No. 1, pp. 1-26.*

* cited by examiner

*Primary Examiner*—Neveen Abel Jalil
*Assistant Examiner*—Farhan M Syed
(74) *Attorney, Agent, or Firm*—Townsend and Townsend and Crew LLP (57) ABSTRACT

A self-managing workload repository (AWR) infrastructure useful for a database server to collect and manage selected sets of important system performance statistics. Based on a schedule, the AWR runs automatically to collect data about the operation of the database system, and stores the data that it captures into the database. The AWR is advantageously designed to be lightweight and to self manage its use of storage space so as to avoid ending up with a repository of performance data that is larger than the database that it is capturing data about. The AWR is configured to automatically capture snapshots of statistics data on a periodic basis as well as purge stale data on a periodic basis. Both the frequency of the statistics data capture and length of time for which data is kept is adjustable. Manual snapshots and purging may also be performed. The AWR captured data allows for both system level and user level analysis to be automatically performed without unduly impacting system performance, e.g., by eliminating or reducing the requirement to repeat the workload in order to diagnose problems.

20 Claims, 2 Drawing Sheets

SELF-MANAGING PERFORMANCE STATISTICS REPOSITORY FOR DATABASES

CROSS-REFERENCES TO RELATED APPLICATIONS

This application is a non-provisional of U.S. Provisional Application Ser. No. 60/500,869, filed Sep. 4, 2003, the contents of which are hereby incorporated by reference.

BACKGROUND OF THE INVENTION

The present invention relates generally to database management, and more particularly to automatic collection and analysis of database statistics.

For most database systems, the tasks of performance monitoring and tuning of the database requires the use of sophisticated tools to collect information and analyze the performance of the database system during the execution of a workload. Such methods can often be costly and inefficient to database users. Database performance is typically characterized by the cumulative amount of time users spend waiting for the database server to respond to their requests. System performance statistics are commonly needed for analysis when a problem has been reported to the administrator of the database system. For example, users may experience unsatisfactory response time while browsing web pages that require fetching data from the database. Collecting data after the fact may sometimes produce fruitless results, as some problems are timing related. This is analogous to taking pictures of a crime scene to catch a criminal after the crime has been committed.

Also, existing mechanisms to collect system data are generally difficult to develop and maintain as they involve data selection, storage, analysis, and the disposal of old data in order to free up space for future data collection. This usually incurs extra cost to database customers as they have to purchase sophisticated monitoring tools from third party vendors, as well as hire experienced database administrators to run these tools for monitoring and tuning purposes.

Accordingly, it is desirable to provide systems and methods that automatically track and store performance-related information in a database system. Such information is useful for automatically tuning and analyzing database system performance.

BRIEF SUMMARY OF THE INVENTION

The present invention provides a self-managing workload repository infrastructure (or "AWR" for Automatic workload repository) which is useful for a database server to collect and manage selected sets of important system performance statistics. In one aspect, performance statistics are retrieved directly from inside the database system and stored in the database. Because the collection process is done inside the database, the collection process is highly efficient as data is retrieved directly from the shared memory of the database kernel. This minimizes the data access cost of joining multiple SQL views.

In one aspect, the AWR infrastructure of the present invention is completely self managed and therefore does not require any additional management intervention. Based on a schedule, automatic collection of selected performance statistics is performed by a system background process. If the system is running smoothly, the collection of system statistics is performed at a very low cost, and does not cause any noticeable degradation to the operation of the customer's database. If the customer's applications are experiencing some performance problems, the collected performance statistics are readily available for system self-tuning advisory modules (advisors) to analyze and tune the system.

According to one aspect of the present invention, the AWR runs automatically to collect data about the operation of the database system e.g., Oracle database system, and stores the data that it captures into the database. The AWR is advantageously designed to be lightweight and to self manage its use of storage space so as to avoid ending up with a repository of performance data that is larger than the database that it is capturing data about. In one embodiment, the AWR is configured to automatically capture snapshots of statistics data on a periodic basis as well as purge stale data on a periodic basis. For example, in a default configuration, the AWR automatically captures statistics data snapshots every 60 minutes and purges data that is over 7 days old. Both the frequency of the statistics data capture and length of time for which data is kept is adjustable. Manual snapshots and purging may also be performed.

The data captured allows both system level and user level analysis to be performed without unduly impacting system performance, e.g., by eliminating or reducing the requirement to repeat the workload in order to diagnose problems. Optimizations are included to ensure that the capture of data is performed efficiently to minimize overhead. For example, one such optimization is in the SQL statement capture; working within the database, deltas (changes) of the data for SQL statements between snapshots are maintained. Maintaining deltas allows the system to capture only statements that have significantly impacted the load of the system (across a number of different dimensions such as CPU and elapsed time) since the previous snapshot in an efficient manner, rather than having to capture all statements that had performed above a threshold level of work since they first appeared in the system. This both improves the performance of the SQL capture and greatly reduces the number of SQL statements that are captured over time. In one aspect, statements are captured based on the cumulative impact of all executions over the time period, so for example, a heavily executed statement that completes in less than one second per execute will be captured alongside a single parallel query that ran for 15 minutes.

According to one aspect of the present invention, a method is provided for capturing performance statistics data in a database system. The method typically includes determining a plurality of capture times, and at each of said capture times, automatically recording a set of one or more database performance statistics to a memory module using a capture process internal to the database system.

According to another aspect of the present invention, a computer readable medium is provided that includes code for controlling a database system to automatically capture performance statistics in the database system. The code typically includes instructions to determine a plurality of capture times, and to automatically record a set of one or more database performance statistics at each of said capture times to a memory module coupled with said database system.

According to yet another aspect of the present invention, a database system is provided that typically includes a database for storing data objects, and a database control process configured to control operation of the database. The control process typically includes a statistics repository module configured to automatically collect a set of one or more database performance statistics at each of a plurality of scheduled times, and store each set of performance statistics to a memory module coupled with the database system.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

The present invention provides systems and methods to automatically capture, store and manage database statistics data.

General Overview

Collecting historical database statistics data is useful to allow analysis of performance problems that occurred in a previous period. Many performance problems are intermittent. Many times when a problem is reported, the problem is no longer happening. If the system has a record of what was going on in the system, it is typically much easier to identify the problems that caused the slowdown. Collecting historical database statistics data is also useful to use as a baseline for comparison with the current performance of the system. As workload changes, such comparisons are useful for identifying and predicting potential bottlenecks in the system.

Accordingly, the present invention provides, in one aspect, a workload repository (WR) module that automatically collects and stores database statistics. The workload repository (WR) is, in one aspect, a collection of persistent system performance statistics. The statistics data in the workload repository may be used by internal clients for self-tuning and is accessible by external clients and users. The collected statistics data is stored in a system-defined WR schema.

In one aspect, the WR maintains a schedule of capture times at which the system will automatically capture statistics that reflect the activities of the system at that point in time. By regularly capturing such statistics, system monitoring and tuning advisors are able to use such statistics to automatically perform analysis for any time interval within which performance data is available. In one aspect, the capturing period is set to a default time interval, such as 60-minutes. In one aspect, WR aligns the scheduled capture time to the top of the hours whenever possible. The statistics collection process is preferably synchronized with database tuning advisors (e.g., ADDM and others as will be discussed below) to perform immediate analysis after the collection process. This allows problems to be detected at the earliest possible time.

To be totally self-managed, the WR in one aspect provides an automatic mechanism to periodically purge data that has become obsolete. For example, in one aspect, this purging of data is automatically done every night, and the amount of data retained is based on a user-configurable period, defaulting to 7 days worth of data. To further avoid system degradation, the WR is configured to perform maintenance tasks inside of a user-designated Maintenance Window wherever possible. Also, to provide optimal access paths for clients, WR ensures that Optimizer statistics are generated automatically on newly collected data. Further, to provide efficient data removal, a partitioning scheme is used for storing large datasets. The splitting and dropping of partitions are all hidden from users.

For statistics data whose volume varies based on the size of the system, the WR is configured in one aspect, to only collect data that belongs to the (top) most active set of entities (potential bottlenecks). For example, performance data for SQL executions are collected only on the most active 30 SQL statements based on criteria such as elapsed and cpu times. By limiting such collections, the WR is able to guarantee a relatively predictable space consumption, as well as a predictable amount of time needed for data analysis, without sacrificing the quality of the captured performance data.

In one aspect, the WR is configured to store data across a database cluster. Data collected across a database cluster is synchronized so that performance tools can use the data to analyze the behavior of the system across the entire cluster. For example, data can be used for load balancing. In one aspect, AWR is configured to store data across multiple databases. This allows performance monitoring tools to use a single database as the central repository for storing performance data for multiple databases.

In preferred aspects, the workload repository provides support for managing snapshots and baselines, which includes their creation and deletion, as well as the retention and comparisons of data using snapshots and baselines. A snapshot is a version of the RDBMS statistics at a certain point in time. For cumulative statistics, data from two snapshots can be used for computing changes (deltas) in the statistics during that period of time. Such deltas can be used to obtain rates of changes. For example, the number of buffer gets per seconds between 3PM and 4PM may be determined using snapshots taken at those two points in time. A baseline is a set of statistics during a period in the past. In one aspect, a baseline can be defined as a pair of snapshots. Users may set up baselines from some representative periods in the past, to be used for comparisons with the current system behavior.

In one aspect, the workload repository supports metrics which are secondary statistics that are derived from base statistics. For example, the measure of the number of logons per second within a certain period is a RDBMS metric. Metrics are used frequently by internal RDBMS clients to determine the health of the system. Since such metrics are needed frequently, metrics for important activities (vital signs) are provided to the RDBMS. The number of buffer gets, number of transactions, and number of logons are examples of important metrics. In one aspect, metrics for commonly needed periods are supported. For example, the time periods of 5 seconds, 15 seconds, and 60 seconds are a reasonable set of periods for computing metrics.

The workload repository also includes a report generation mechanism that produces a summary report on statistics in the workload repository.

System Framework Architecture

Figure 1:
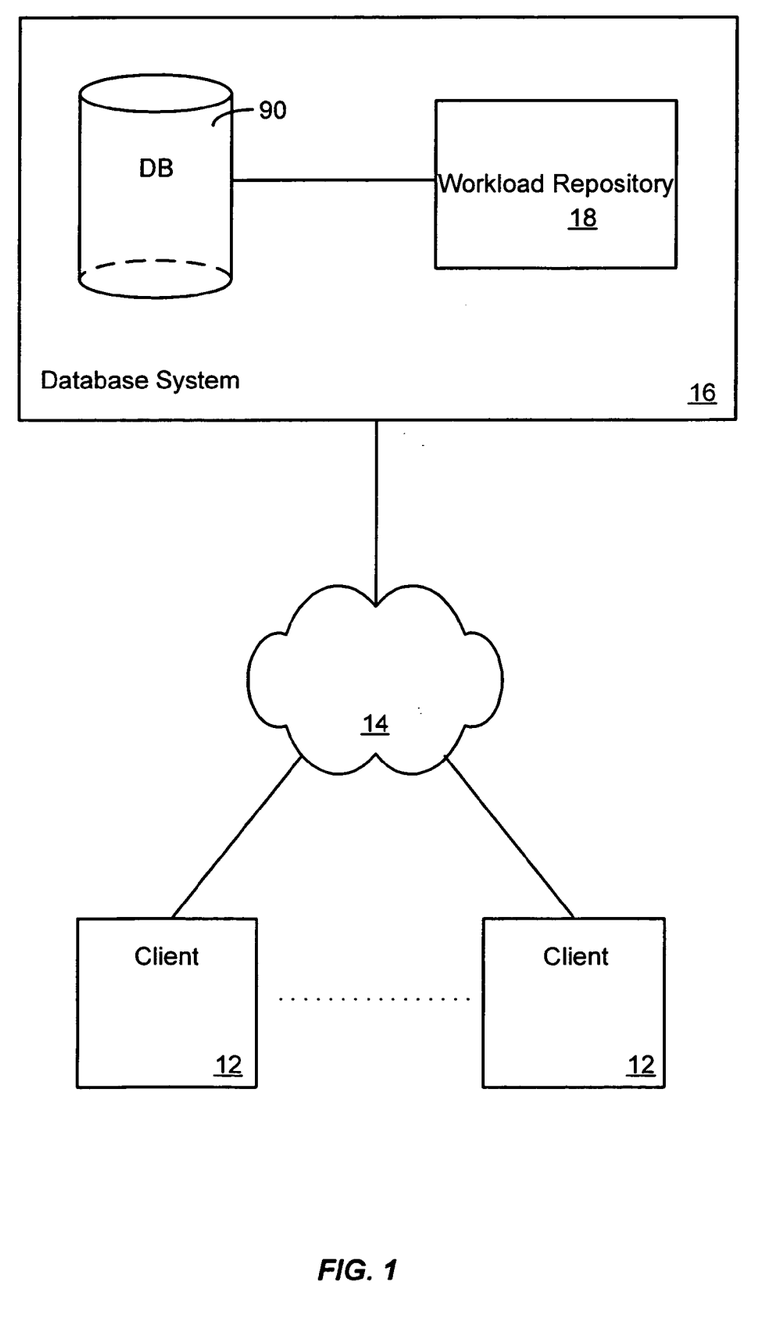
FIG. 1 illustrates a database system wherein an automatic workload repository system framework according to the present invention might be used.

FIG. 1 illustrates a database system 16 wherein an automatic workload repository system framework 18 might be used. As illustrated in FIG. 1 any user systems 12 might interact via a network 14 with database system 16. The users of those user systems 12 might be users in differing capacities and the capacity of a particular user system 12 might be entirely determined by the current user. For example, where a developer is using a particular user system 12 to interact with database system 16, that user system has the capacities allotted to that developer. However, while an administrator (e.g., DBA) is using that user system to interact with system 16, it has the capacities allotted to that administrator. System 16 also includes, in one aspect, a separate storage module (not shown), such as one or more hard disks for storing collected statistics and other data.

Network 14 can be a LAN (local area network), WAN (wide area network), wireless network, point-to-point network, star network, token ring network, hub network, or other configuration. One of the most common type of network in current use is a TCP/IP (Transfer Control Protocol and Internet Protocol) network such as the global internetwork of networks often referred to as the "Internet" with a capital "I". For example, user systems 12 might communicate with system 16 using TCP/IP and, at a higher network level, use other common Internet protocols to communicate, such as HTTP, FTP, AFS, WAP, etc.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs a client interface module, such as an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., DBA) of user system 12 to access, process and view information and pages available to it from system 16 over network 14. Each user system 12 also typically includes one or more user interface devices, such as a keyboard, a mouse, touch screen, pen or the like, for interacting with a graphical user interface (GUI) provided on a display (e.g., monitor screen, LCD display, etc.) in conjunction with pages, forms and other information provided by system 16 or other systems or servers. The client interface module of system 12 typically implements or interfaces with a server module (not shown, but may be referred to herein as an Enterprise Management module) configured to create web pages for display on client 12 in response to requests from client 12. As discussed above, the present invention is suitable for use with any type of network such as the Internet, an intranet, an extranet, a virtual private network (VPN), a non-TCP/IP based network, any LAN or WAN or the like.

According to one embodiment, each user system 12 and all of its components are operator configurable using applications, including computer code run using a central processing unit such as an Intel Pentium processor or the like. Similarly, database system 16 and all of its components might be operator configurable using application(s) including computer code run using a central processing unit such as an Intel Pentium processor or the like, or multiple processor units. Computer code for operating and configuring database system 16 to intercommunicate and to process and store tables, pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, or any other scripting language, such as VBScript, Perl, Python, or TCL.

According to one embodiment, system 16 includes a database 90 for storing objects and data according to various object schema. For example, database 90 typically stores data created and used by an enterprise. In one embodiment, database 90 is a relational database, and database system 16 implements a database server management application (e.g., Oracle 9i or 10g) adapted to store, update and retrieve data based on SQL-formatted and other types of commands. If more than one database system is used, they may be located in close proximity to one another (e.g., in a server farm located in a single building or campus), or they may be distributed at locations remote from one another (e.g., one or more servers located in city A and one or more servers located in city B). The system 16, in one aspect, could be implemented in a standalone system with an associated data storage repository or database, or it could include one or more logically and/or physically connected servers distributed locally or across one or more geographic locations. Additionally, the term "server" is meant to include a computer system, including processing hardware and process space(s), and an associated database storage system and database server application (e.g., Oracle RDBMS such as Oracle 9i or 10g) as is well known in the art. It should also be understood that "server system" and "server" may be used interchangeably herein. Similarly, the databases described herein can be implemented as single databases, a distributed database, a collection of distributed databases, a database with redundant online or offline backups or other redundancies, etc., and might include a distributed database or storage network and associated processing intelligence. The database may also be implemented in a clustered environment.

In one aspect, a variety of internal database clients may interact with, and access information and statistics data collected and stored in, the workload repository 18. Internal clients might include internal database tuning advisory modules such as a SQL advisory, an Object Advisory and others. Additional internal clients might include Alert Generation and Automatic Task Management modules, a Time model module (collects and processes time-usage statistics on various database activities), and an Automatic Database Diagnostic Monitor(ADDM). Various aspects of such internal database client modules and others can be found in U.S. Non-provisional application Ser. No. 10/775,513, entitled "The Time Model", filed Feb. 9, 2004 (issued May 20, 2008 as U.S. Pat. No. 7,376,682); U.S. Non-provisional application Ser. No. 10/775,733, entitled " Capturing Session Activity as In-Memory Snapshots Using a Time-Based Sampling Technique Within a Database for Performance Tuning and Problem Diagnosis", filed Feb. 9, 2004 (issued Nov. 6, 2007 as U.S. Pat. No, 7,292,961); U.S. Non-provisional application Ser. No. 10/775,531, entitled "Automatic Database Diagnostic Monitor Architecture", filed Feb. 9, 2004; U.S. Provisional Application Ser. No. 60/500,869, entitled "Self Managing Database Architecture", filed Sep. 4, 2003; and U.S. Provisional Application Ser. No. 60/500,864, entitled "Automatic Database Diagnostic Monitor Architecture", filed Sep. 5, 2003, the contents of which are hereby incorporated by reference.

In one aspect, an enterprise management ("EM"; not shown) module is provided to expose the workload repository and other internal and external clients to an external user. For example, the EM provides, in one aspect, a graphical user interface (GUI) that allows a user to interact with the workload repository and various internal and external client modules. Thus, in one aspect, an external client such as a database administrator, using a browser on client system 12, may interact with a GUI module (e.g., enterprise management module) to access data and to view reports generated using workload repository 18.

Workload Repository Schema

Figure 2:
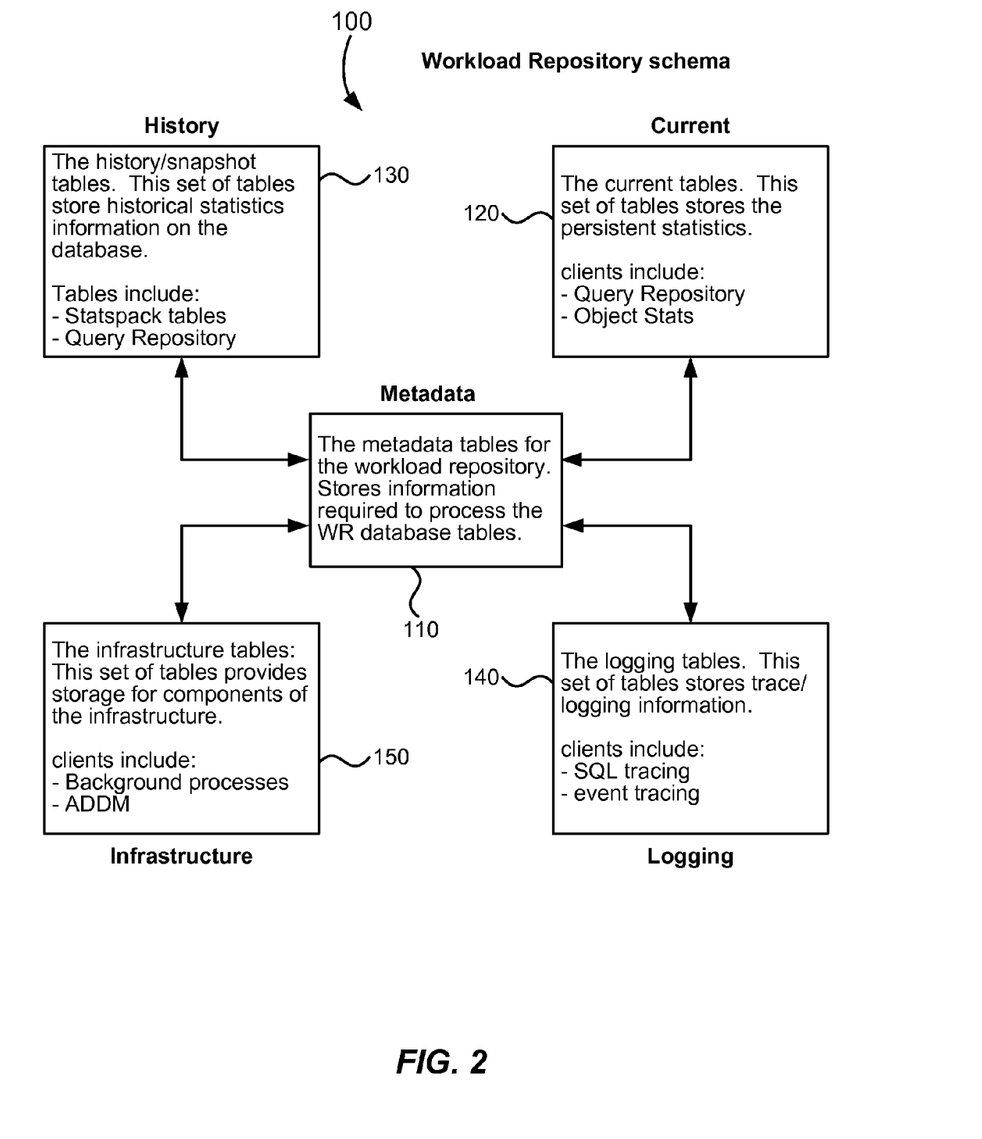
FIG. 2 illustrates a workload repository schema according to one embodiment of the present invention.

FIG. 2 illustrates a workload repository schema 100 according to one embodiment of the present invention. As shown, in one aspect, schema 16 includes five types of WR tables. The first type, metadata tables 110, are used to control, process, and describe the WR tables. The current tables 120 and historical statistics tables 130 store statistical information about the database. The logging tables 140 provide generic logging and tracing capabilities to clients of the database server. Infrastructure tables 150 provide support for internal infrastructure (e.g., RDBMS components) clients. Names of the WR tables are prefixed with WRx$ with x specifying the type of table, e.g., "M" for Metadata, "H" for History/snapshot, "I" for Infrastructure, "C: for Current and "L" for Logging as shown in Table 1, below, which summarizes five different types of tables in the WR schema.

TABLE 1

| Name Prefix | Table Type | Table Description |
| --- | --- | --- |
| WRM$ | Metadata | Stores metadata information for the WR. Used for processing WR tables. |
| WRH$ | Snapshot/History | Stores historical statistics data. |
| WRI$ | Infrastructure | Used by database infrastructure components. |
| WRC$ | Current | Stores current statistics data. |
| WRL$ | Logging | Stores tracing and logging information. |

In one aspect, metadata tables 110 store two main types of information: control information on how to collect WR data, and general information that describes the WR statistics data. Control metadata information includes settings for parameters that control how data is written to disk. An example of a parameter is the snapshot level. General metadata information includes snapshot id-to-time mapping information and general database attributes such as database name, database id, database version, session id, and instance number.

Snapshots tables 130 contain a history of performance statistics data. They contain data captured from memory, e.g., in-memory database views, at different points in time. Data from two snapshots may be used to analyze the behavior of the database system. A report of the system activity may be generated using data from a pair of snapshots.

Infrastructure tables 150 provide support for internal infrastructure clients for monitoring and report generation.

Current tables 120 store the latest set of statistics that was transferred from memory to disk. Storing a current, persistent on-disk copy of in-memory statistics allows statistics to survive instance crashes. If an instance unexpectedly crashes, these current statistics can be loaded from disk into memory once the instance restarts. Also, current tables can be used for memory overflow in case virtual memory is needed for a particular set of statistics.

Logging tables 140 are used for logging data and tracing information. An example of a client for this type of table is SQL trace. Clients use a system-defined API that allows them to write logging and tracing information into the workload repository in an efficient manner. The method of collecting the trace information into the logging tables is transparent to the user. The user may control the logging of data through ON/OFF parameters.

Snapshots

A snapshot is a set of history of performance statistics captured in the workload repository at a certain time in the past. The most common source of data comes from performance statistics in in-memory database views. The most common use of snapshots is for computing the rate of change of a statistic used for performance analysis. In such cases, the changes in values between two snapshots are computed using the cumulative values at the begin and end snapshots of the time period. For example, the average number of physical reads of the system between a time period may be determined by using the physical_reads statistics in a wrh$buffer_pool_statistics table.

Most statistics are tracked using cumulative totals. For example, the physical_reads statistics tracks the total number of physical_reads since the start of the instance. The delta values of some statistics are tracked. For example, for SQL statements delta values for parse_calls, elapsed_time, etc. are tracked.

Each snapshot is preferably identified by a snapshot sequence number (snaprid) that is unique within the workload repository. For example, in one aspect, each row in the snapshot tables 130 is tagged with a snapshot_id, which represents the time when the data is captured to disk. The WRM$_SNAPSHOT table stores the mapping between the snapshot_id and the actual wall-clock time. Also, each row is tagged with the database_id and instance_number. The three attributes (snapshot-id, database_id, instance_number) are used as the key to identify snapshots.

The snapshot tables 130, in one aspect, are organized into the following categories:
1. File Statistics
2. General System Statistics
3. Concurrency Statistics
4. Instance Tuning Statistics
5. SQL Statistics
6. Segment Statistics
7. Undo Statistics
8. Time Model Statistics
9. Recover Statistics
10. RAC Statistics Snapshot Generation Snapshots can be generated in two ways, automatically and manually. In one aspect, the RDBMS generates snapshots automatically every 30 minutes by default. Users can adjust the frequency of snapshot capture by changing a snapshot INTERVAL parameter, e.g., by adjusting to the nearest 10-minute interval. For a given INTERVAL setting, the system will try its best to align the start snapshot times as close to the top of the hour as possible. For example, if the INTERVAL setting is 30 minutes, the job might be run at hh:00 and HH:30. Of course such alignments may not always be possible, e.g., INTERVAL=17 minutes. Since internal advisory modules may rely on these snapshots to perform analysis, adjustment of the interval setting may affect the precision of diagnosis made by the RDBMS. For example, if the INTERVAL is set to 4 hours, spikes that occur within 30 minute intervals may be missed. Users may also take manual snapshots, e.g., by invoking a PL/SQL procedure. This is supported in conjunction with the automatic snapshots that the system generates. Manual snapshots may be used, for example, when users want to capture the system behavior at two specific points in time, that do not coincide with the automatic schedule.

Automatic snapshots are generated by an internal database background action that runs periodically. Users may turn off the automatic snapshot generation. The automatic snapshot generation job, in one aspect, is configured to avoid generating snapshots that are too close to each other. For example, if a snapshot has been taken (most likely manually) within the last 5 minutes, the system will not generate another snapshot until the next cycle. Manual snapshots are pushed as desired by users.

For statistics that track delta values, the deltas are computed for the period between the last snapshot and the current snapshot. The workload repository preferably does not differentiate between manual or automatically generated snapshots. Users can analyze the system by using any pair of snapshots.

Snapshot Levels

Users can control the set of statistics to capture by using a STATISTICS-LEVEL parameter. Here is the mapping between STATISTICS_LEVEL and the snapshot statistics:

1. Basic-Level—OFF. No statistics will be captured.
2. Typical-Level—this is the default level, which includes all statistics that are typically needed by the system to monitor system behavior. Examples include statistics about latches, latch misses, instance activity, wait events, SQL statements and database objects.
3. All-Level—includes entire set of statistics stored in WR.

Cluster Database Environment

In a cluster database environment, each snapshot captures data from the entire database cluster. In one aspect, each snapshot captures data from all instances in the same cluster. To make sure snapshots capture information that describes the cluster with respect to a certain point in time, data from each instance is retrieved at around the same wallclock time, and is tagged with the same snapshot id. In another aspect captured data is stored separately for each individual instance, and is tagged with an instance id. For example, the buffer_busy_wait statistics shows the number of buffer waits on each individual instance. In one aspect, the workload repository does not store aggregated data across the cluster, however, if desired, users can easily obtain such values by using a GROUPBY clause when querying the WR tables.

Efficient Name/Text Flushing

If file names, statistic names, and SQL text are blindly captured for every single snapshot, the amount of space needed for snapshots can become quite large. To achieve more efficient space usage for the workload repository, in one aspect, the WR stores statistic names, parameter names, file names and sql text separate from the actual statistic values, and eliminates duplicate entries.

Text for Statistic Names

When users query the WR for a statistics value, they can either identify the statistics by the name or the number. The number is shorthand for the name, and there are in-memory database views that externalize the statistics name-to-number mapping. For example, an in-memory v$statname view shows the mapping between a session/system statistics name and a number, and an in-memory v$statname view can be used to query the desired statistics in in-memory v$sysstat and in-memory v$sesstat views. The statistics name-to-number mappings are static per database version.

Since the statistics names and numbers do not change within a database version, the statistics name-to-number mappings need only be stored once per version in the workload repository. Once the statistics names are stored, only the statistic number and value have to be captured. In this manner, by not storing the statistic name for each flush, space usage is reduced.

To query the statistics value for a given snapshot and statistics name, the metadata tables are used to find out from which database version the snapshot was taken, and to find the statistics number using one of the name tables. The statistics number is used to find the statistics value. If the user knows the snapshot was taken for the same version as the current version, the user can simply perform a join with the in-memory name view and statistics data table.

For example, given snapshot id 20 and the event name 'buffer busy waits', the user performs the following query to retrieve the statistics value from wrh$_system_event:

```
SELECT event.total_waits, event.time_waited
  FROM WRH$_SYSTEM_EVENT event WRH$_EVENT_NAME
  eventname,
      WHERE eventname.name = 'buffer busy waits'
      AND eventname.event_id = event.event_id
      AND snap_id = 20
```

File Names wrh$_datafile and wrh$_tempfile tables are provided to store the names of the datafiles, tempfiles, and tablespace in a location separate from where the statistics are stored. Storing the file name only once in the workload repository will provide a large space savings. When a new file is detected, information such as the file#, creation_change#, filename, tablespace#, and tablespace name are recorded in these new tables. The next time this file is seen, the filename does not have to be recorded again, and only the file#, creation_ change#, and file statistic values need to be stored in the statistics tables. To retrieve the file statistics information by the file name, a join is performed on the (file#, creation_ change#) key using the file statistics and file name tables. For example, to query the file statistics for a file with the name 't_dbl.f' and snapshot id 20, the following query can be used:

```
SELECT file.phyrds, file.phywrts
    FROM WRH$_FILESTATXS file, WRH$DATAFILE filename,
    WHERE filename.name = 't_dbl.f' and
        filename.file# = file.file# and
        filename.creation_change# = file.creation_change# and
        file.snap_id = 20.
```

SQL Text

A WRH$_SQLTEXT table is used to store the complete SQL statement text in a location separate from where the SQL statistics are stored. The text for a SQL cursor is captured only once per appearance in the shared pool. This saves space as the SQL text can be many bytes.

When capturing the SQL statistics, if the SQL text does not exist in the WRH$_SQLTEXT table, an entry that includes the SQL hash value, length of the SQL statement, address, command type, and SQL text is inserted into WRH$_SQL-TEXT. If the SQL text already exists in WRH$_SQLTEXT, no rows are inserted into this table.

For example, users would query the WRH$_SQLTEXT table to retrieve the appropriate hash_value for a SQL statement of interest. If the user knows the first part of a SQL statement, the following query can be used to help obtain the hash_value:

```
SELECT hash_value, piece, sql_text
FROM WRH$_SQLTEXT
WHERE sql_text LIKE 'select column1, column2 from table where %'.
```

Once the user has figured out the hash_value, the following query can be used to calculate the difference between two snapshots.

```
SELECT endsql.executions - begsql.executions,
endsql.disk_reads - begsql.disk_reads
FROM WRH$_SQLSTAT begsql, WRH$_SQLSTAT endsql
WHERE begsql.snap_id_snap1 and endsql.snap_id = snap2 AND
      begsql.hash_value = 12345 AND
begsql.hash_value = endsql.hash_value.
```

Flushing Parameters

System parameter settings are seldom changed. To save both space and flushing time, parameters are preferably only flushed to disk for a snapshot if any of the parameters has been changed since the last snapshot was taken. In one aspect, a parameter id is provided for this purpose. Each parameter id identifies a set of parameter values, stored in a wrh$_parameter table. The parameter_id column is a key column to the wrh$_parameter table. Each snapshot is associated with a parameter id, stored in the wrm$_snapshot table.

In one aspect, a Boolean flag is used to track whether any parameter settings have changed since the last snapshot. During a flush, if the flag is true, meaning at least one setting has changed, the whole set of parameter settings are captured in the wrh$_parameter table with a new parameter_id. If the flag is false, the snapshot simply associates the snapshot with the most recent parameter id. At the end of the flush, the flag is reset to false.

To view the setting of a parameter, the wrh$_parameter and the wrh$_snapshot tables may be joined. For example, to view the value of the 'UNDO-MANAGEMENT' parameter for shapshot 10, the following query can be used:

```
SELECT value
FROM WRH$_PARAMETER para, WRH$_PARAMETER_NAME
     para_name, WRM$_SHAPSHOT snap
WHERE
     para_name.parameter_name = 'UNDO_MANAGEMENT' and
     para_name.parameter_hash = para.parameter_hash and
     snap.snap_id = 10 and
        snap.parameter_id = para.parameter_id;
```

TOP N SQL Statistics

SQL statistics is one of the most important kind of statistics used for performance analysis. Since there are usually a large number of SQL statements in the shared pool, efficient capturing of SQL statistics can become tricky. If everything in the in-memory SQL execution cache is blindly captured, the amount of information captured can be unnecessarily large. For example, in a large system, a shared pool can hold more than 20,000 SQL statements. Drawbacks to such an approach include taking a long time to flush and taking up a large amount of disk space.

In one aspect, to reduce the volume of captured data, only the top consumers are captured based on several criteria. One goal is to capture on the average around 100 to 200 SQL statements per snapshot although fewer or more may be captured.

According to one aspect, for each snapshot, the set of Top N SQL statements are selected based on the following criteria:

1. Elapsed Time
2. CPU Time
3. Parse Calls
4. Shareable Memory
5. Version Count

For the first three criteria (Elapsed Time, CPU Time, Parse Calls), the delta values are tracked for each SQL statement. The delta values represent the amount of activity from the last snapshot to the current snapshot. For Shareable Memory and Version Count, the value at the time of the snapshot is used.

In one aspect, when a snapshot is taken, the code walks through the cursor cache and picks out the Top N consumers for each criteria by performing a sort. For the criteria with deltas, the SQL is sorted based on the values of the delta. With this method, it is possible to come up with the set of the SQL with the most activity in the snapshot interval. For the other criteria, the SQL is sorted based on the current statistic value. Once the Top N statements are computed for each criteria, all the statements are merged into one list. This list of SQL and their associated statistics are then flushed to disk.

In a default out-of-box case, the value for Top N is dependent on the statistics level for automatic snapshots and the flush level for manual snapshots. Table 2-1 describes the Top N values for the supported statistics/flush levels according to one aspect:

TABLE 2-1

| | Top N SQL for Level | |
|---|---|---|
| Statistics/Flush Level | Top N for each criteria | Estimated Number of SQL per Snapshot |
| TYPICAL | 30 | 50-120 (min—30, max—150) |
| ALL | 100 | 120-300 (min—100, max—500) |

Parent & Child Cursor Statistics

To select top N SQL statements, the deltas of parent cursors are used. That is, a SQL statement will only be selected if the sum of the cpu, elapsed, or parse calls statistics for its children exceeds the x % criteria. For each selected top SQL, statistics are aggregated by SQL plan and stored in the wrh$_sqlstat table. That is, statistics for child cursors with the same parent and of the same plan are aggregated and stored as one row in the wrh$_sqlstat table. Each row is identified by the (hash_value, plan_hash_value) columns.

Storing Cumulatives and Deltas

For each selected SQL statement, both cumulative totals and deltas are stored. In the wrh$_sqlstat table, two separate columns (e.g., xxx_total.xxx_delta) are provided for each statistic. For example, a buffer_gets_total column stores the cumulative totals of the number of buffer gets since the start of the instance, and a buffer_gets_delta column stores the number of buffer gets performed in the last interval. Statistics such as Sharable_Memory will not be affected. The same is done for Time Model statistics.

In order to compute deltas when a snapshot is taken, in memory the cumulative total value of each statistics as of the beginning of the current snapshot period is tracked. This can potentially use a lot more memory and consume extra cpu processing. If such processing costs more than 1% of the current memory and cpu consumption for snapshot capturing, an alternative is to only keep deltas for the more important statistics (e.g., cpu, elapsed, and parse calls).

Merging on Purging

When purging old snapshots, some statistics from the purged snapshots should be merged into the surviving snapshots. Otherwise, the snapshot data may not truly reflect the actual activities during those periods. As one example, consider deltas for the number of parse calls in four snapshots (S1, S2, S3, S4), each 30 minutes apart. For a particular SQL, the parse calls statistics might be:

| Snapshot | Hash Value | Parse Calls |
|---|---|---|
| S1 | 12345 | 21000 |
| S2 | 12345 | 15000 |
| S3 | 12345 | 5000 |
| S4 | 12345 | 18000 |

In this example, the correct average parse calls between S1 and S4 should be 7.1/sec. If S2 and S3 are purged without merging, S4 will appear to have a parse_calls delta of 18000 in the last one and a half hour (since S1), which would yield a wrong average rate of 3.3/sec. The correct action is to add the S2 and S3 counts to S4:

| Snapshot | Hash Value | Parse Calls |
|---|---|---|
| S1 | 12345 | 21000 |
| S4 | 12345 | 38000 |

If the purged (SQL) row in S2 S3 does not exist in S4 (possible since only top SQLs are tracked), a new row will have to be inserted into S4.

For any SQL that exists in S4 but not in S2 and S3, the average rate for the merged period for that SQL becomes smaller. This is probably acceptable as the SQL statement probably was not quite active during the two periods.

Similar actions are preferably taken for cumulative statistics. In the above example, if a SQL exists in S2 but not in S4, the SQL should be inserted into S4 using the S2 cumulative values. Unlike deltas, no action needs to be taken if the SQL already exists S4.

Top N Segment Statistics

TopN segment statistics are captured in ways similar to SQL statistics. Examples of segment statistics for capture include:

unused space, number of buffers in cache, number of rows, full table scans, logical reads, physical reads, row lock waits, itl waits, and buffer busy waits.

Additional statistics useful for Object Space Advisories include:

space used (deltas in bytes), space allocated (deltas in bytes), row piece access count, non-head piece access count, and non-tail row piece access count where row piece size <½ maximum row pick size for block.

Criteria for Capturing Segment statistics

Segment Statistics are captured based on several criteria. For example, in one aspect, segment statistics are captured similar to the top SQL as discussed above. Table 2-2 shows an example of statistics and criteria:

TABLE 2-2

| Top N Segment Delta Criteria | |
|---|---|
| Statistics | description |
| logical read count | logical reads |
| wait counts | buffer_busy_waits + itl_waits + row_lock_waits |
| RAC stats | global_cache_cr_blocks_served + global_cache_current_block_served |

In one aspect, the top segments are captured by sorting the top N for each of the statistics.

Storing Cumulatives and Deltas

For each segment that is selected based on the TopN criteria, all statistics about the segment are captured from the in-memory segment statistics view. Both cumulatives and deltas are stored for each statistics. In the wrh$_segstat table, a delta column is provided for each segment statistics that tracks cumulative totals. This approach can potentially take up a lot of memory and require extra processing. One goal is for it to not exceed 1% of space and cpu consumption. If it turns out to be expensive, an alternative is to keep deltas only for the stats used as criteria.

Snapshot Purging Policy

To make room for capturing new statistics, old snapshots are purged automatically in one aspect, e.g., by a database background action every night. The purge task is run in a predefined window of time where the database is not heavily loaded, if possible. The amount of historical statistics retained in the workload repository can be controlled by a retention setting. In general, snapshots are removed automatically based on chronological order. Snapshots that belong to baselines are retained until their baselines are removed. Old data is deleted as snapshots are removed. When a shapshot is chosen to be removed, the entire set of data belonging to the snapshot is preferably removed.

Users may control how much WR information to retain by changing a WR RETENTION setting via a procedure. The length of time (in number of days) is specified. By default, WR keeps 7 days of data. Automatic purging can be turned off by setting RETENTION to zero.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for managing performance statistics data in a database system, the method comprising:

determining, with a workload repository module of the database system executed by one or more processors associated with one or more computer systems as an internal system background process of the database system, a set of one or more database performance statistics to be used in optimizing performance of operations in a database provided by the database system;

determining, with the workload repository module, a plurality of capture times;

at each of said capture times, capturing a snapshot for the database by capturing a current value for each database performance statistic in the set of database performance statistics with the workload repository module from a shared memory of the database system, determining a cumulative value for each database performance statistic in the set of database performance statistics with the workload repository module based on the current value for each database performance statistic in the set of database performance statistics, and storing the cumulative values for each database performance statistic in the set of database performance statistics in association with the respective capture time to the database;

determining, with the workload repository module, a delta representing an amount of activity to a most recent snapshot from a previous snapshot taken prior to the most recent snapshot for each database performance statistic in the set of database performance statistics using a plurality of corresponding cumulative values and storing each delta in association with the most recent snapshot to the database, each delta including information regarding a change in value data for the respective database performance statistic between the most recent snapshot and the previous snapshot taken just prior to the most recent snapshot;

determining, with one or more database tuning advisory modules executed by the one or more processors associated with the one or more computer systems as internal system background processes of the database system, a rate of change for each database performance statistic in the set of database performance statistics by dividing each delta by a time interval, the time interval being between the most recent snapshot and the previous snapshot; and adjusting, with the one or more database tuning advisory modules, performance of one or more operations in the database based on the rate of change determined by dividing the delta by the time interval for each database performance statistic in the set of database performance statistics.

2. The method of claim 1, wherein determining the plurality of capture times comprises determining a time interval between each of said capture times based on a default value.

3. The method of claim 2, further including adjusting the time interval based on user input.

4. The method of claim 1, further including aligning at least a subset of the capture times to occur on the hour.

5. The method of claim 1, further including determining a purging schedule for deleting database performance statistics stored in the database by the workload repository module.

6. The method of claim 5, further including deleting database performance statistics stored in the database according to the purging schedule.

7. The method of claim 5, wherein determining the purging schedule includes setting a time interval for deleting a set of database performance statistics to a default value based on the time that set of statistics is stored to the memory module.

8. The method of claim 7, wherein the time interval is user configurable.

9. The method of claim 1, wherein the set of database performance statistics includes one or more of performance data for SQL executions, SQL statements, wait events, instance activity and database objects.

10. The method of claim 9, wherein performance data for SQL executions includes one or more of processor usage time, elapsed time, number of parse calls, and memory usage.

11. The method of claim 1, further including determining one or more metrics using one or more of said recorded sets of database performance statistics.

12. The method of claim 11, wherein said one or more metrics includes one or more of a logon rate, a number of logons, a number of transactions, and a number of buffer gets.

13. A computer-readable storage medium having stored thereon computer-executable code for managing performance statistics in a database system, the computer-readable storage medium comprising:

code that includes instructions for determining, with a workload repository module of the database system that executes as an internal system background process of the database system, a set of one or more database performance statistics to be used in optimizing performance of operations in a database provided by the database system;

code that includes instructions for determining, with the workload repository, a plurality of capture times;

code that includes instructions for, at each of said capture times, capturing a snapshot for the database by capturing a current value for each database performance statistic in the set of database performance statistics with the workload repository module from a shared memory of the database system, determining a cumulative value for each database performance statistic in the set of database performance statistics with the workload repository module, and storing the cumulative values for each database performance statistic in the set of database performance statistics in association with the respective capture time to the database;

code that includes instructions for determining, with the workload repository module, a delta representing an amount of activity to a most recent snapshot from a previous snapshot taken prior to the most recent snapshot for each database performance statistic in the set of database performance statistics using a plurality of corresponding cumulative values and storing each delta in association with the most recent snapshot to the database, each delta including information regarding a change in value data for the respective database performance statistic between the most recent snapshot and the previous snapshot taken just prior to the most recent snapshot;

code that includes instructions for determining, with one or more database tuning advisory modules executing as internal system background processes of the database system, a rate of change for each database performance statistic in the set of database performance statistics by dividing each delta by a time interval, the time interval being between the most recent snapshot and the previous snapshot; and code that includes instructions for adjusting, with the one or more database tuning advisory modules, performance of one or more operations in the database based on the rate of change determined by dividing the delta by the time interval for each database performance statistic in the set of database performance statistics.

14. The computer-readable storage medium of claim 13, further comprising code that includes instructions for deleting database performance statistics stored in the database according to a purging schedule.

15. The computer-readable storage medium of claim 13, wherein the set of database performance statistics includes one or more of performance data for SQL executions, SQL statements, wait events, instance activity and database objects.

16. The computer-readable storage medium of claim 13, further comprising code that includes instructions for adjusting the timing of said plurality of capture times in response to user input.

17. A database system, comprising:
   a processor;
   a database for storing data objects; and
   a database control process including instructions that, when executed by the processor, cause the processor to control operation of the database, said control process including:
      a statistics repository module operating as an internal system background process programmed to:
         determine a set of one or more database performance statistics to be used in optimizing performance of operations in the database;
         determine a plurality of capture times;
         at each of said capture times, capture a snapshot for the database by capturing a current value for each database performance statistic in the set of database performance statistics from a shared memory of the database, determine a cumulative value for each database performance statistic in the set of performance statistics based on the current value for each database performance statistic in the set of database performance statistics, and store the cumulative values for each database performance statistic in the set of performance statistics in association with the respective capture time to the database; and
         determine a delta representing an amount of activity to a most recent snapshot from a previous snapshot taken prior to the most recent snapshot for each database performance statistic in the set of database performance statistics using a plurality of corresponding cumulative values and store each delta in association with the most recent snapshot to the database, each delta including information regarding a change in value data for the respective database performance statistic between the most recent snapshot and the previous snapshot taken just prior to the most recent snapshot; and
      one or more database tuning advisory modules executing as internal system background processes programmed to:
         determine a rate of change for each database performance statistic in the set of database performance statistics by dividing each delta by a time interval, the time interval being between the most recent snapshot and the previous snapshot; and
         adjust performance of one or more operations in the database system based on the rate of change determined by dividing the delta by the time interval for each database performance statistic in the set of database performance statistics.

18. The database system of claim 17, wherein the database control process is further configured to delete database performance statistics in the memory module according to a purging schedule.

19. The database system of claim 17, wherein the database control process is further configured to adjust the timing of said plurality of capture times in response to user input instructions.

20. The database system of claim 17, wherein the set of database performance statistics includes one or more of performance data for SQL executions, SQL statements, wait events, instance activity and database objects.

* * * * *

UNITED STATES PATENT AND TRADEMARK OFFICE
CERTIFICATE OF CORRECTION

PATENT NO. : 7,774,312 B2
APPLICATION NO. : 10/934771
DATED : August 10, 2010
INVENTOR(S) : Gary Ngai et al.

It is certified that error appears in the above-identified patent and that said Letters Patent is hereby corrected as shown below:

In column 8, line 18, delete "(snaprid)" and insert -- (snap_id) --, therefor.

In column 8, line 25, delete "(snapshot-id," and insert -- (snapshot_id, --, therefor.

In column 11, line 31, delete "shapshot" and insert -- snapshot --, therefor.

In column 11, line 37, delete "SHAPSHOT" and insert -- SNAPSHOT --, therefor.

In column 14, line 35, delete "shapshot" and insert -- snapshot --, therefor.

Signed and Sealed this
Twenty-fourth Day of May, 2011

David J. Kappos
*Director of the United States Patent and Trademark Office*